United States Patent Office 2,801,396
Patented July 30, 1957

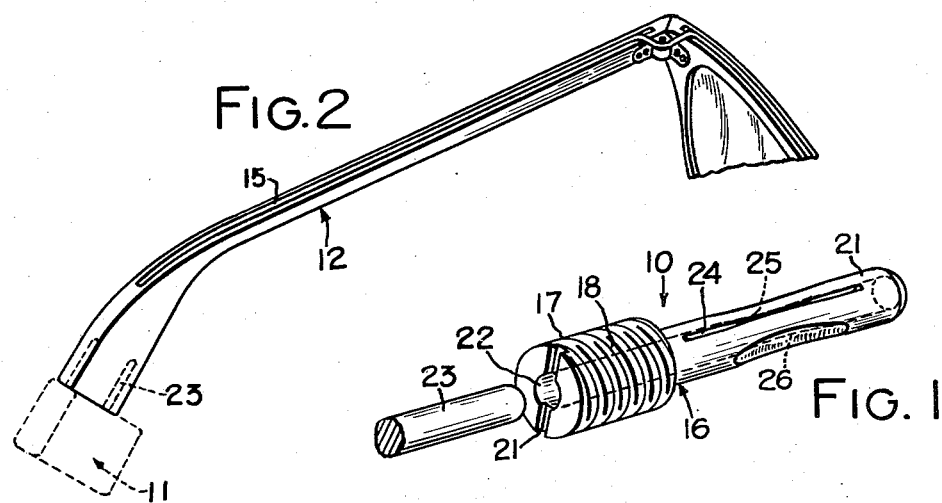
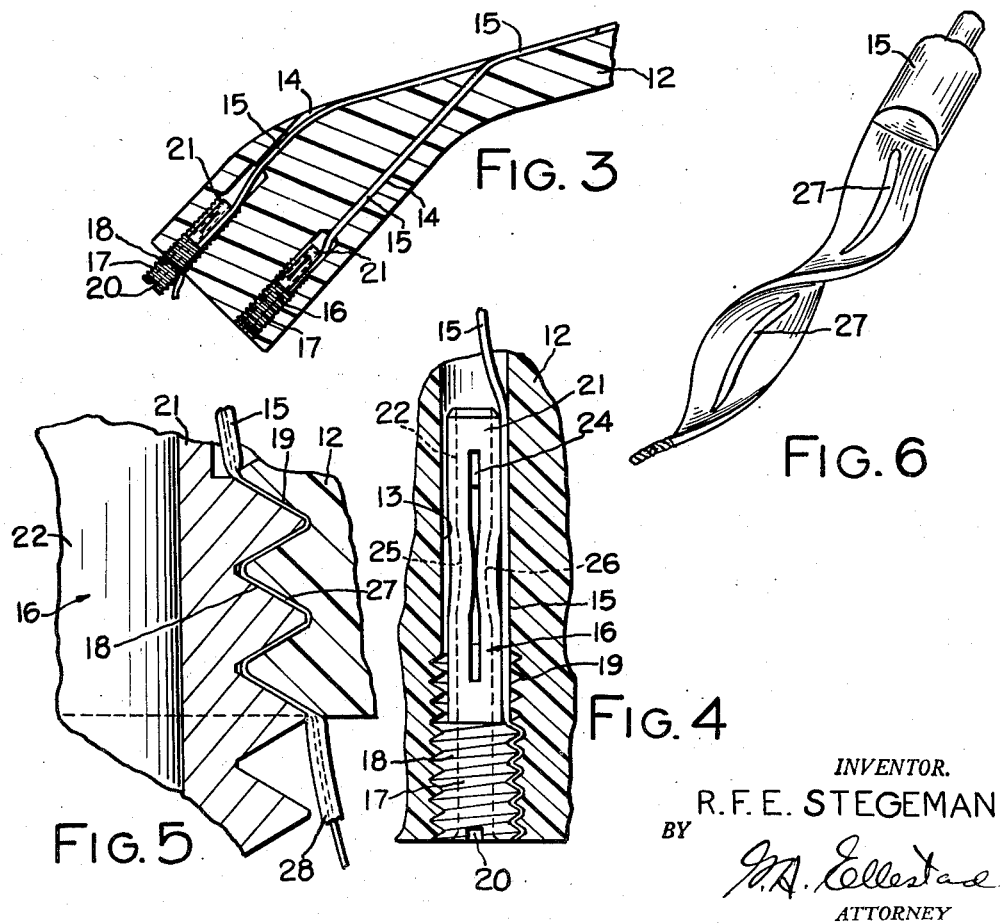

2,801,396
ELECTRICAL CONNECTOR

Raymond F. E. Stegeman, Greece, N. Y., assignor to Bausch & Lomb Optical Company, Rochester, N. Y., a corporation of New York Application May 18, 1956, Serial No. 585,700

2 Claims. (Cl. 339—97)

This invention relates to electrical connectors and more particularly it relates to improvements in separable or quick detachable type of connectors.

It is an object of this invention to provide a separable electrical connector comprising a plug and a socket which are frictionally held in engagement with each other, the socket part being adapted to be quickly, easily and securely installed in and electrically connected to a device which it serves. Another object is to provide such a connector having a socket which may be connected to an electrical conductor easily and conveniently.

Further objects and advantages will be apparent in the novel details of construction and arrangement and combination of its parts by referring to the specification hereinbelow and to the accompanying drawing in which:

Fig. 1 is an enlarged perspective view of an electrical connector constructed according to my invention.

Fig. 2 is a partial perspective view showing one use of my invention in a spectacle temple to support a hearing aid thereon.

Fig. 3 is an enlarged fragmentary side view in longitudinal section of the spectacle temple having the socket part of said connector assembled therein.

Fig. 4 is a further enlarged fragmentary view of the connector socket shown in Fig. 3.

Fig. 5 is a fragmentary greatly enlarged sectional view of a part of the connector and specacle temple, partly assembled, and Fig. 6 is a fragmentary perspective detail of an electrical connecting wire after use.

One of the advantageous uses of my invention is shown in Figs. 2 and 3 of the drawing wherein an electrical connector, generally indicated at 10 in Fig. 1, is used to support and transmit electrical impulses to a hearing aid 11 on a spectacle temple 12. The connector 10 is suitably contained in a free fitting opening 13 formed in a dielectric material, such as plastic, from which the temple 12 is made. Leading into the rear part of the opening 13 and extending along the top side of the temple is a small channel 14 through which an insulated wire or conductor 15 is drawn to serve the connector as hereinafter explained.

According to my invention, the connector 10 comprises a metallic tubular socket, generally shown at 16 in Fig. 1, at one end of which a head 17 is formed. On the outer surface of the head 17, threads 18 are provided which loosely engage within an interior thread 19 formed in the mouth of the opening 13 in the temple 12. For assembly purposes, a screw driver slot 20 is provided in the rear face of the head 17.

Integral with the head 17 and extending into the opening 13 therefrom is a tubular metallic sleeve 21 which has an outer diameter considerably smaller than the bottom diameter of the thread 18 or the diameter of the opening 13 so as to provide space for the wire 15 between the walls of the opening and sleeve. The socket 16 has a central bore 22 extending therethrough wherein a plug 23 or the like on the hearing aid 11 is slidably fitted. To retain the plug 23 frictionally within the bore 22, the walls of the sleeve 21 are provided with longitudinal slits 24 to afford some radial yield to internal pressure. The opposite sides of the sleeve 21 are furthermore inwardly indented about midway along the slits 24 to provide two contact areas 25 and 26 within the bore 22, said areas bearing forcibly and resiliently against the plug 23 when it is assembled in the bore.

As best shown in Fig. 5, the diameters of the coacting internal and the external threads 19 and 18, respectively, are so proportioned that the total clearance therebetween is substantially equal to the diameter of the metallic part of the insulated wire 15 so that as the head 17 of the socket 16 is screwed into the threads 19, the insulation on said wire will be crushed and stripped off to expose spots 27 of bare wire, as shown in Fig. 6. The screw threads 18 on the head portion 17 not only serve to abrade and tear the insulating cover from the metallic part of the wire 15 but at the same time serve to bind the wire in secure electrical contact with the socket 16. The end 28 of the wire 15 shown in Fig. 5 which projects beyond the thread is easily cut off after assembly is complete.

In assembling the above-described structure, the insulated conductor 15 is first drawn out through the opening 13 and is held bent back around the end of the temple 12 overlying the threads 19 while the sleeve portion 21 of the socket 16 is set into the opening. By the use of a screw driver in the slot 20, the threads 18 of the head portion are then screwed into the threads 19, thus crushing the insulation on the wire 15 positioned therebetween and exposing the spots of bare wire 27 so that electrical contact is established between the bare wire and threads 18. With the socket 16 thus anchoring the wire 15 solidly in place, the plug 23 on the hearing aid may be engaged in the socket bore 22 whereby the hearing aid 11 is supported on one temple and is effectively electrically connected for immediate operation. In Fig. 3, one of the sockets 16 is shown partly assembled and the other completely assembled.

It will be realized that by means of this invention, a simple unitary connector member is so constructed that it serves three functions, namely, it demountably supports an electrical unit such as a hearing aid in readiness for operation, it provides frictional means for holding together the parts of the connector, and as a consequence of assembling the socket, it not only anchors the wire but also strips the insulation off from the wire to make electrical contact with the connector.

Although only a preferred form of this invention has been shown and described in detail hereabove, it is to be understood that other embodiments are possible and changes may be made in the form and arrangement of its parts and the details of construction thereof without departing from the spirit of the invention as set forth in the claims herebelow.

I claim:

1. A separable electrical connector by means of which an electrical circuit and a supporting relationship is established between two devices, said connector including a metallic socket and complementary plug which are mounted individually in said two devices, a head portion formed on said socket, the outer surface of said portion having a thread formed thereon and a sleeve portion of reduced size formed integrally in tandem with the head portion, said socket having a central bore therethrough in which said plug is slidably fitted, the walls of said sleeve portion being indented at opposite points along its wall to provide a constriction of the bore smaller than said plug, said walls being slotted longitudinally on opposite sides near said constriction to provide radial resilience thereof, one of said devices comprising dielectric material in which a socket receiving opening is formed, socket attachment threads formed in said opening and an electrical conductor wire extending along said opening and across said attachment threads, said socket threads and attachment threads being constructed to provide such a clearance therebetween that the conducting part of said wire will be held therebetween as the respective threads are screwed together.

2. A separable connector of the plug and socket type by means of which two devices are coupled mechanically and electrically, one of said devices being formed of dielectric material in which an opening is formed wherein said connector is accommodated, said connector comprising in combination a socket having a central bore therethrough for receiving said plug and having a head portion on which an exterior thread is formed, and a cylindrical sleeve portion formed integrally in tandem with said head portion, the sleeve portion being of a diameter smaller than the bottom diameter of said exterior thread and larger than said bore so as to provide a clearance space between the sleeve and opening, an interior thread formed within said opening to engage freely with said exterior thread, and an insulated wire extending along said space and across said threads, the clearance distance between the respective threads being substantially equal to the thickness of the metallic core of the wire whereby its insulation is stripped off and electrical contact is made with the socket as it is screwed into said interior thread.

No references cited.